United States Patent
Fujita

(10) Patent No.: US 12,533,929 B2
(45) Date of Patent: Jan. 27, 2026

(54) VEHICLE AIR CONDITIONING APPARATUS

(71) Applicant: SANDEN CORPORATION, Isesaki (JP)

(72) Inventor: Taichi Fujita, Isesaki (JP)

(73) Assignee: SANDEN CORPORATION, Isesaki (JP)

( * ) Notice: Subject to any disclaimer, the term of this patent is extended or adjusted under 35 U.S.C. 154(b) by 389 days.

(21) Appl. No.: 18/043,680

(22) PCT Filed: Sep. 17, 2021

(86) PCT No.: PCT/JP2021/034261
§ 371 (c)(1),
(2) Date: Mar. 1, 2023

(87) PCT Pub. No.: WO2022/059769
PCT Pub. Date: Mar. 24, 2022

(65) Prior Publication Data
US 2023/0373266 A1    Nov. 23, 2023

(30) Foreign Application Priority Data
Sep. 18, 2020    (JP) .................... 2020-157476

(51) Int. Cl.
*B60H 1/00*    (2006.01)

(52) U.S. Cl.
CPC ..... *B60H 1/00464* (2013.01); *B60H 1/00285* (2013.01); *B60H 1/00564* (2013.01)

(58) Field of Classification Search
CPC ............ B60H 1/00464; B60H 1/00285; B60H 1/00564

USPC .......................................... 454/144
See application file for complete search history.

(56) References Cited

U.S. PATENT DOCUMENTS 2,623,735 A * 12/1952 Schofield ........... B60H 1/00464
165/99

FOREIGN PATENT DOCUMENTS

| JP | 2004-276707 A | 10/2004 | |
| JP | 2007-196847 A | 8/2007 | |
| JP | 2018-069854 A | 5/2018 | |
| WO | WO-2018079286 A1 * | 5/2018 | ............... B60H 1/00 |

OTHER PUBLICATIONS

Tsukuda, Takaharu, JP2007196847 Translation.pdf, "Air conditioner for automobile", Aug. 2007, pp. 1-11.*

(Continued)

*Primary Examiner* — Avinash A Savani
*Assistant Examiner* — Ryan L Faulkner
(74) *Attorney, Agent, or Firm* — Baker Botts L.L.P.

(57) ABSTRACT

A vehicle air conditioning apparatus 1 installed between a part under a seat and a floor of a vehicle includes a blower unit 2 including a blower, and a heat exchanger unit 3 including a heat exchanger. The blower unit and the heat exchanger unit are connected with one another to form an air flow path along the floor of the vehicle. The blower unit is detachably connected with the heat exchanger unit in a direction crossing the air flow path and being along the floor of the vehicle.

7 Claims, 8 Drawing Sheets

(56) References Cited

OTHER PUBLICATIONS

Tsukamoto, Daisuke, WO2018079286 Translation.pdf, "Air conditioning unit", May 2018, pp. 1-60.*
International Search Report mailed Nov. 9, 2021 for International Application No. PCT/JP2021/034261.
Japan Patent Office, Notice of Reasons for Refusal issued in Japanese Patent Application No. 2020-157476, dated Mar. 12, 2024.

* cited by examiner

VEHICLE AIR CONDITIONING APPARATUS

TECHNICAL FIELD

The present invention relates to a vehicle air conditioning apparatus, in particular, a vehicle air conditioning apparatus installed in the cabin of a construction machine.

BACKGROUND ART

There has been known a vehicle air conditioning apparatus installed between a seat bracket just under the driver seat and the floor of a construction machine (for example, Patent literature 1). This vehicle air conditioning apparatus includes a blower and a heat exchanger provided in a case and arranged side by side in the horizontal direction of the vehicle. The blower takes in the air from the inside or the outside of the vehicle, and the heat exchanger adjusts the temperature and the humidity of the taken air to supply the air into the vehicle.

CITATION LIST

Patent Literature

PTL1: Japanese Patent Application Laid-Open No. 2004-276707

SUMMARY OF INVENTION

Problem to be Solved by the Invention

In the above-described vehicle air conditioning apparatus, when conducting maintenance such as cleaning, repair and replacement of functional parts in the blower and the heat exchanger, the worker cannot access the parts targeted for the maintenance unless the seat bracket and the driver seat disposed on the vehicle air conditioning apparatus are fully removed, and the case is taken out. Therefore, the number of steps of the maintenance is large and this complicates the maintenance, and consequently it takes a lot of work and time to conduct the maintenance. In this way, it takes a lot of time to conduct the maintenance, and consequently the period of time to stop the operation of a construction machine for the work is prolonged. In particular, the blower takes in the air from the outside of the vehicle, and therefore dust and coarse particulate are more prone to adhere to the blower than the heat exchanger, and the frequency of the maintenance is higher than the heat exchanger. Accordingly, it is desired for the blower to improve the efficiency of the maintenance.

The present invention has been achieved in consideration of the circumstances, and it is therefore an object of the invention to, in particular, reduce the number of steps of the maintenance of the blower in the vehicle air conditioning apparatus, and to improve the efficiency of the maintenance.

Solution to Problem

The present invention provides a vehicle air conditioning apparatus installed between a lower part of a seat and floor of vehicle. The vehicle air conditioning apparatus includes a blower unit including a blower, and a heat exchanger unit including a heat exchanger. The blower unit and the heat exchanger unit are connected with one another to form an air flow path along the floor of the vehicle. The blower unit is detachably connected with the heat exchanger unit in a direction crossing the air flow path and being along the floor of the vehicle.

Effect of the Invention

According to the invention, blowers are installed as a blower unit in the vehicle air conditioning apparatus, and therefore, in particular, it is possible to reduce the number of steps of the maintenance of the blowers, and consequently to improve the efficiency of the maintenance.

DESCRIPTION OF EMBODIMENTS

Hereinafter, an embodiment of the invention will be described with reference to the drawings. In the description below, the same reference number denotes the same component with the same function, and duplicate description for each of the drawings is omitted accordingly. In addition, as to direction of X, Y, and Z in each of the drawings, X direction and Y direction indicate horizontal directions, and Z direction indicates a vertical direction.

Figure 1:
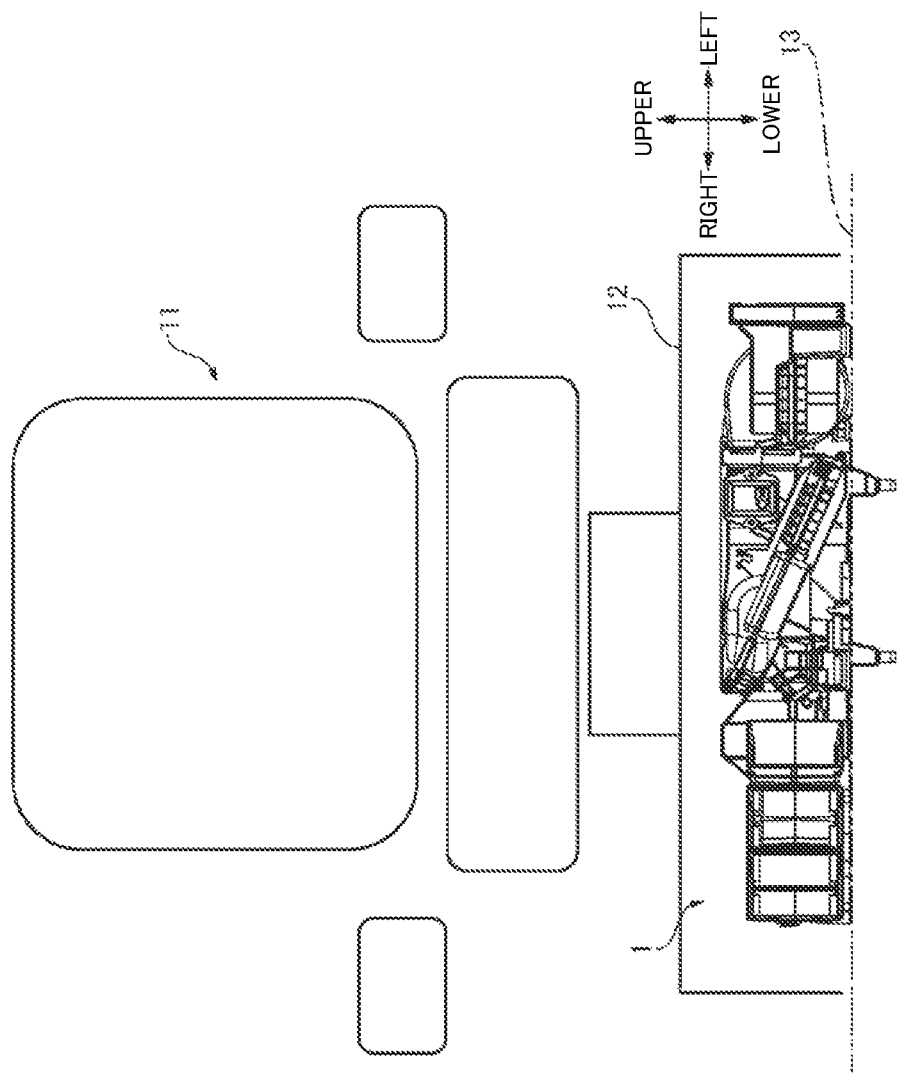
FIG. 1 illustrates a schematic configuration in which a vehicle air conditioning apparatus according to an embodiment of the invention is applied to a vehicle.

As illustrated in FIG. 1, a vehicle air conditioning apparatus 1 is installed between a seat bracket 12 for supporting a driver seat 11 and a floor 13 under the driver seat 11 in the cabin of a vehicle such as a construction machine to adjust the temperature and the humidity in the vehicle compartment. In each of the drawings, the Y direction indicates the front-to-back direction of the vehicle, and the X direction indicates the right and left direction (width direction) of the vehicle.

Figure 2:
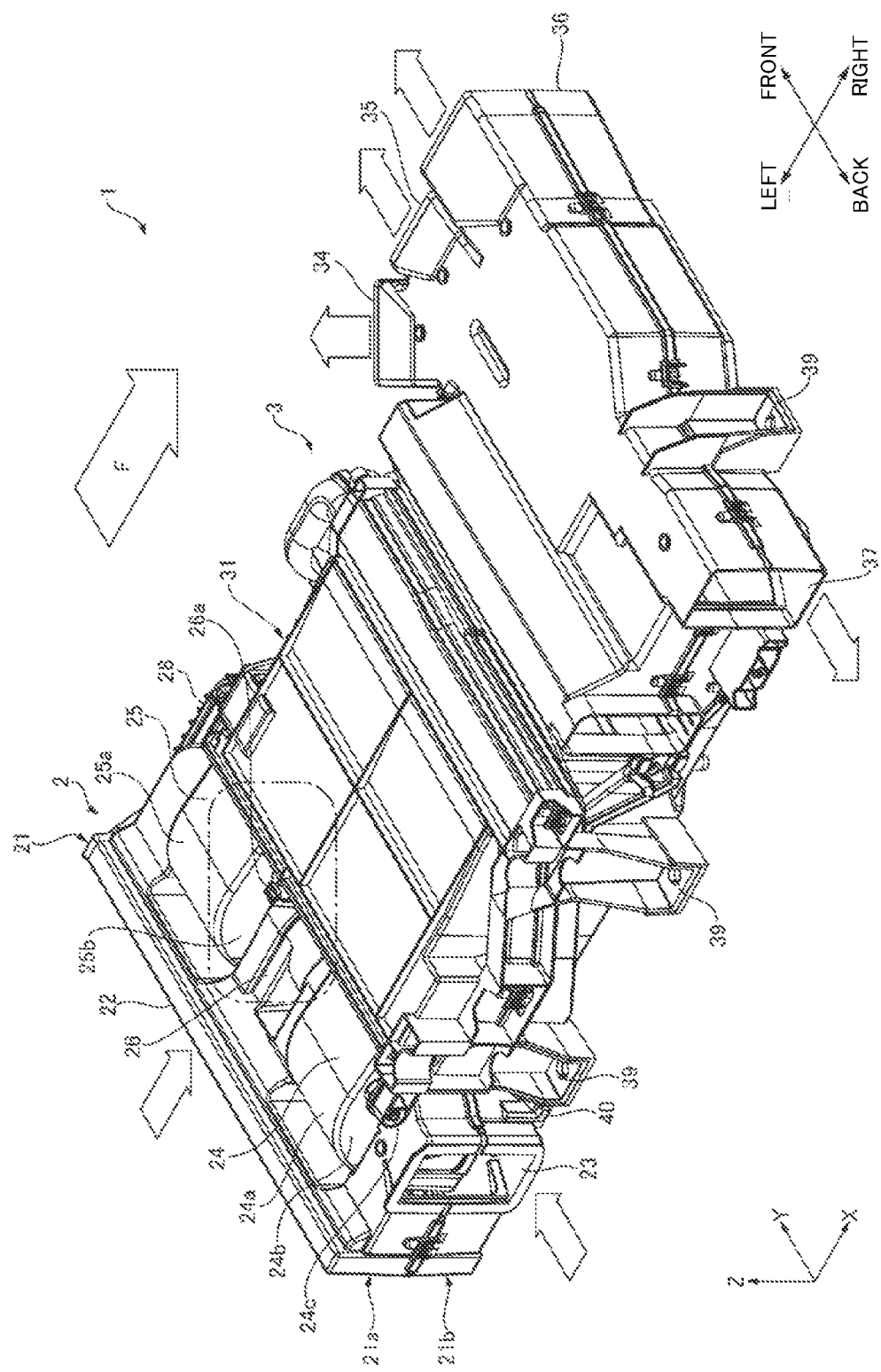
FIG. 2 is a perspective view illustrating a schematic configuration of the whole vehicle air conditioning apparatus according to an embodiment of the invention.
Figure 3:
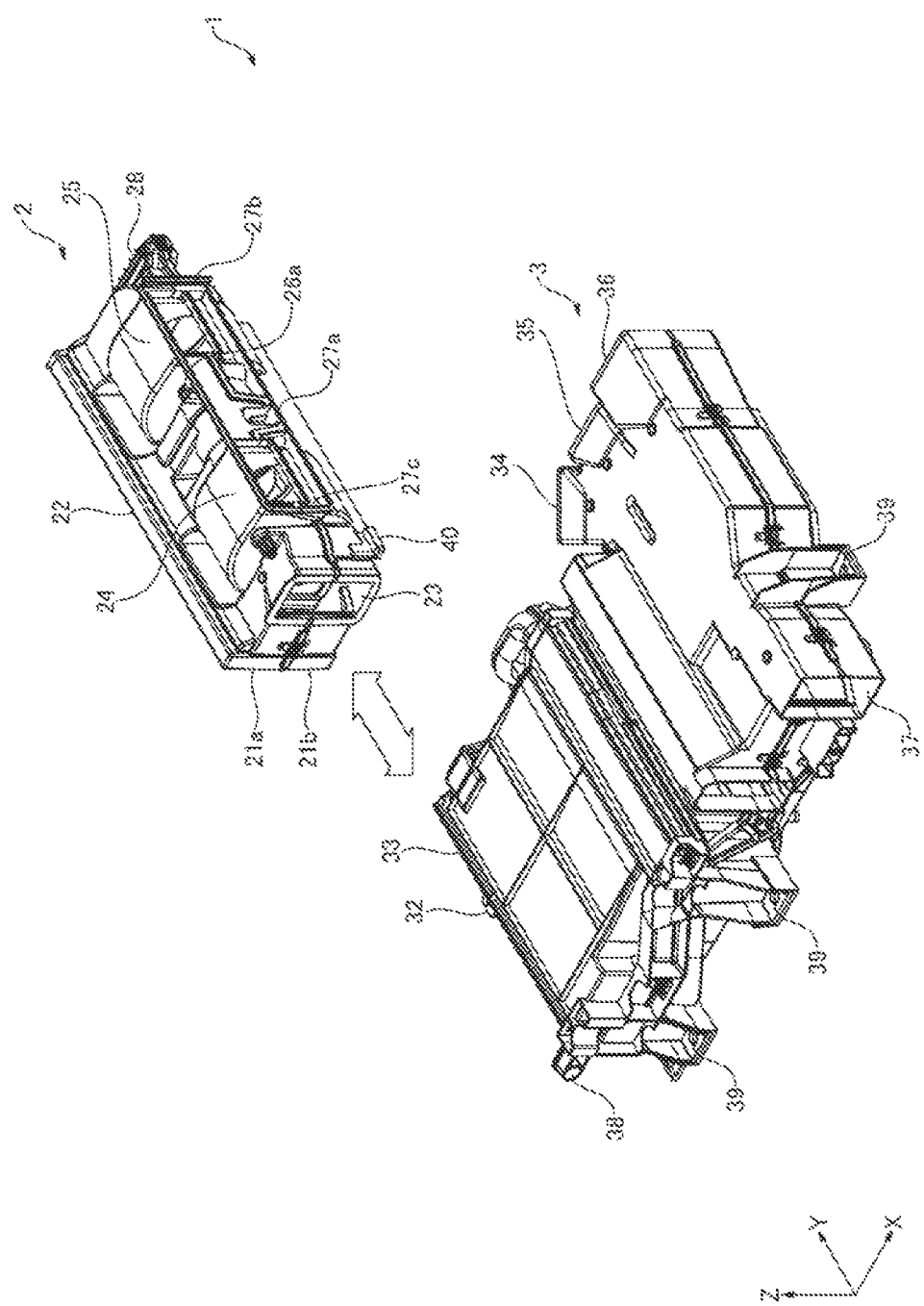
FIG. 3 is an exploded perspective view illustrating the schematic configuration of the vehicle air conditioning apparatus according to an embodiment of the invention.
Figure 4:
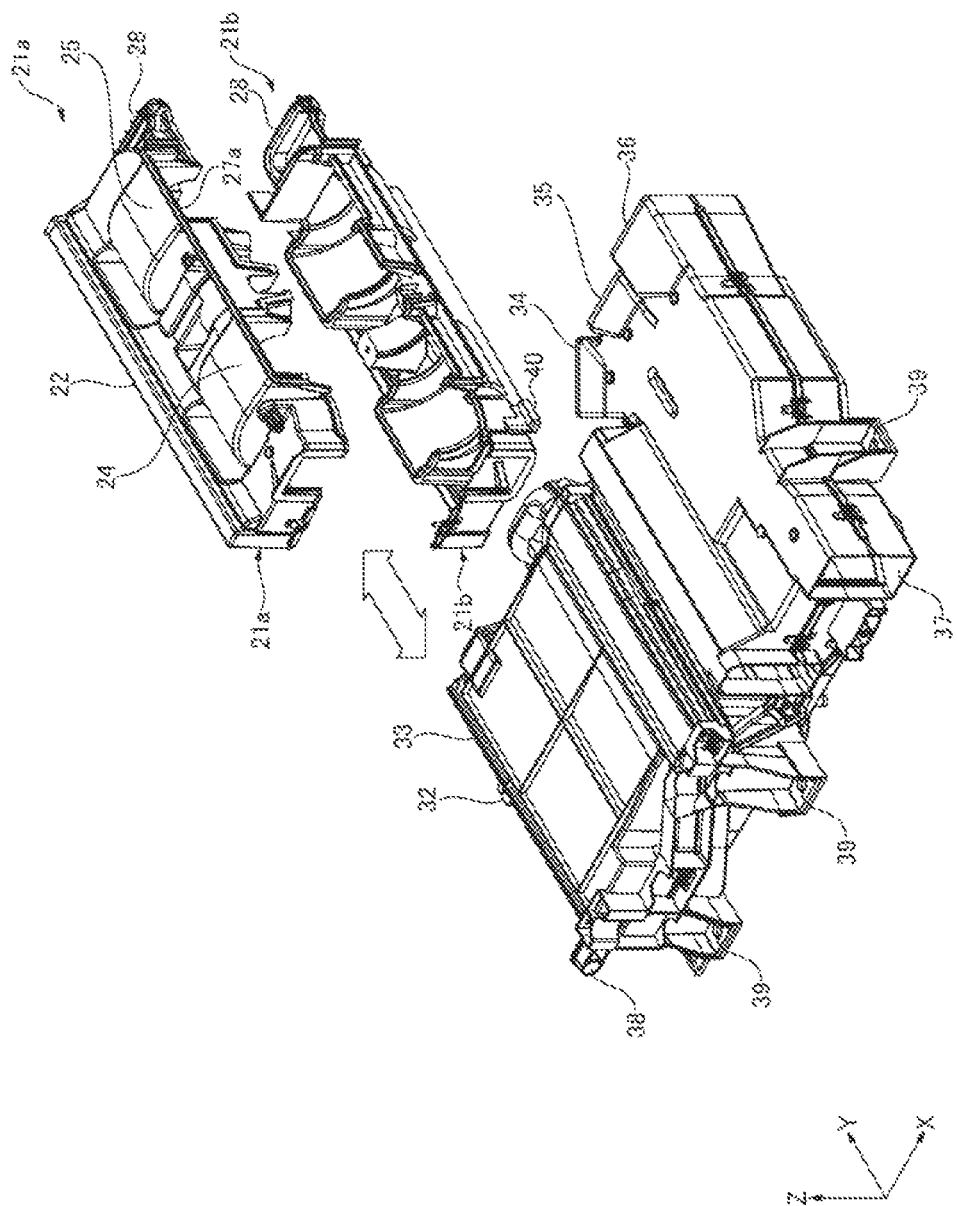
FIG. 4 is an exploded perspective view illustrating the schematic configuration of the vehicle air conditioning apparatus according to an embodiment of the invention.
Figure 5:
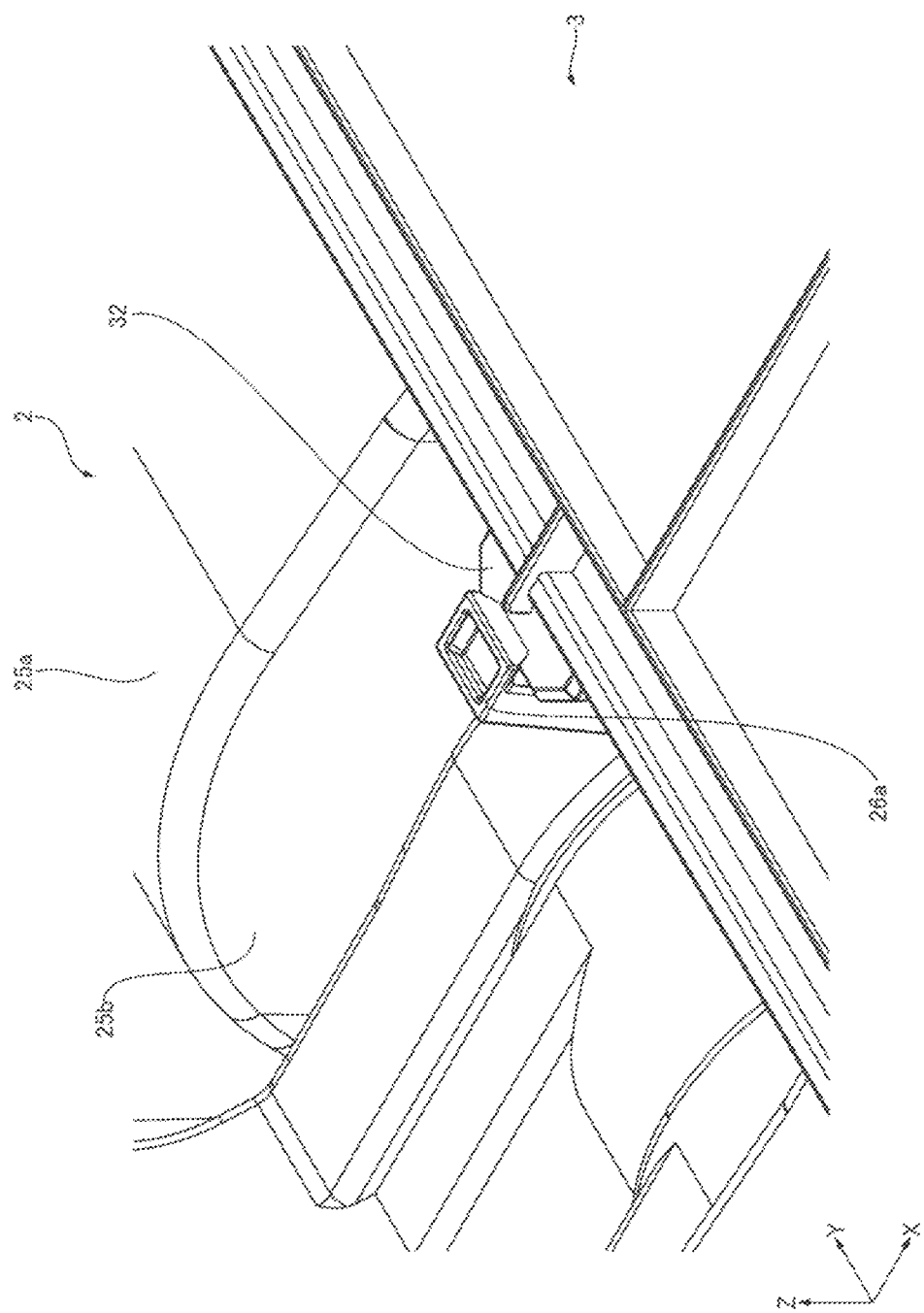
FIG. 5 is a partial enlarged view illustrating an area enclosed by a dashed line of FIG. 2.
Figure 6:
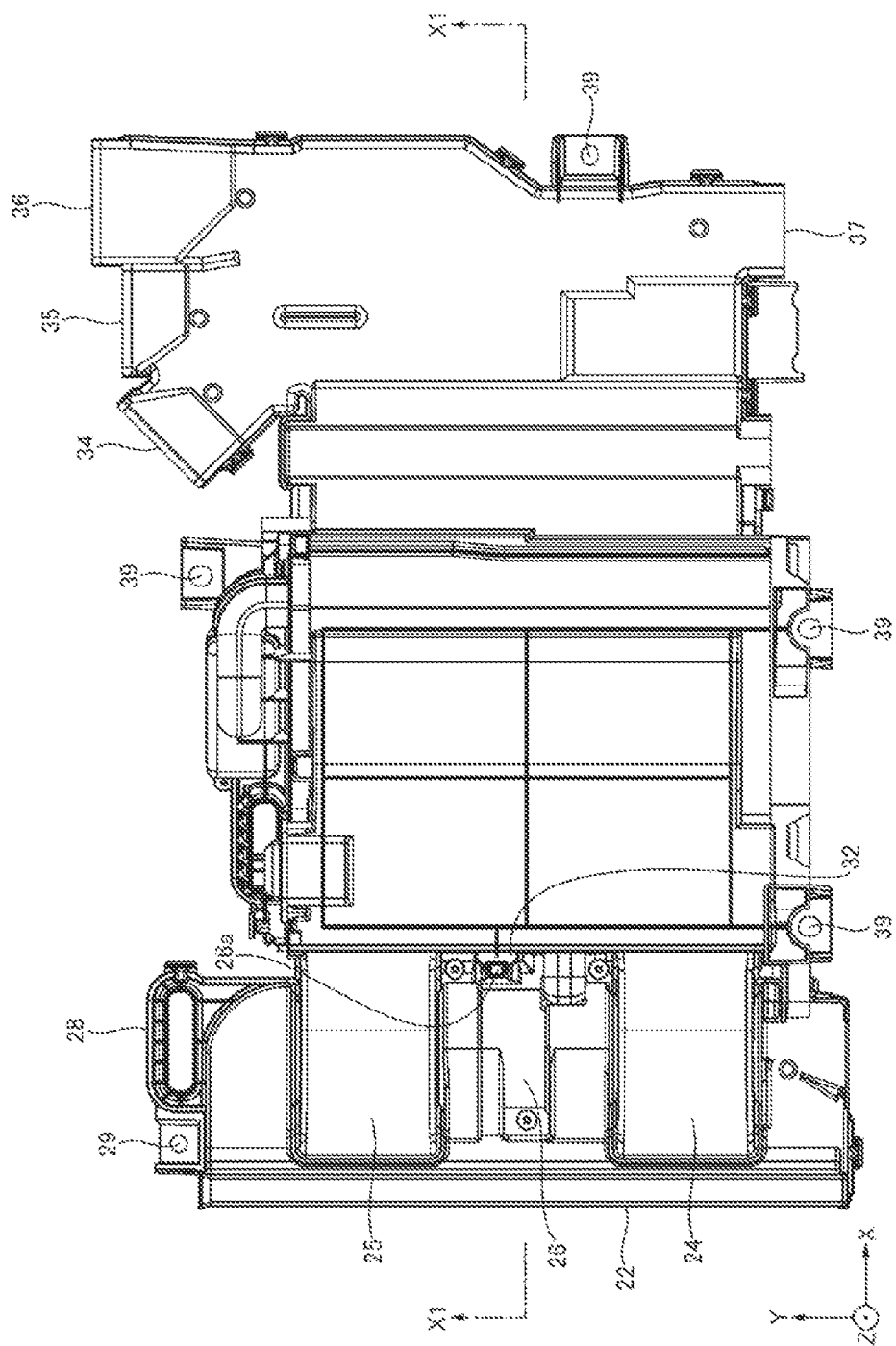
FIG. 6 is a plan view illustrating the schematic configuration of the vehicle air conditioning apparatus according to an embodiment of the invention.
Figure 7:
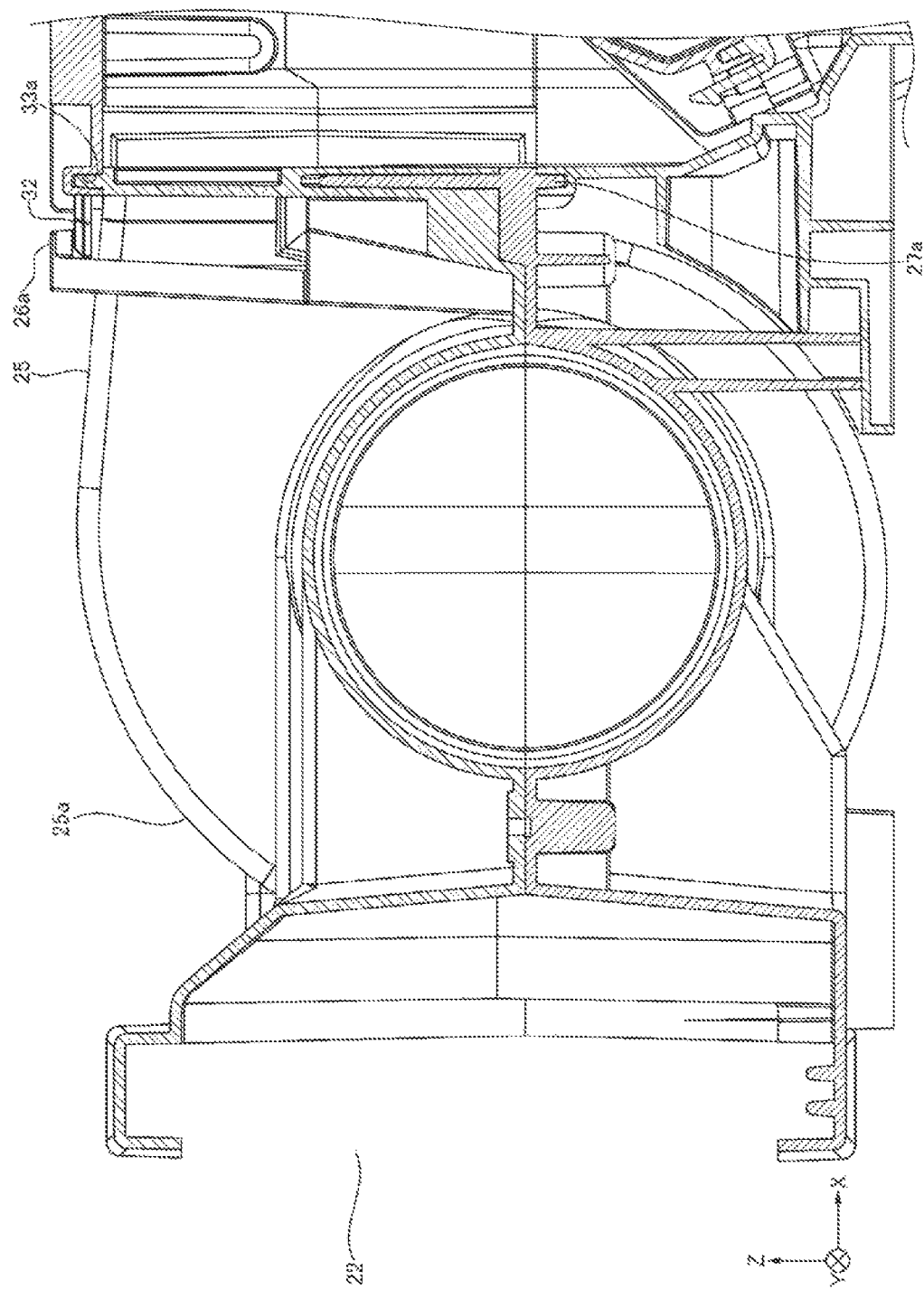
FIG. 7 is a cross-sectional view taken along line X1-X1 of FIG. 6.
Figure 8:
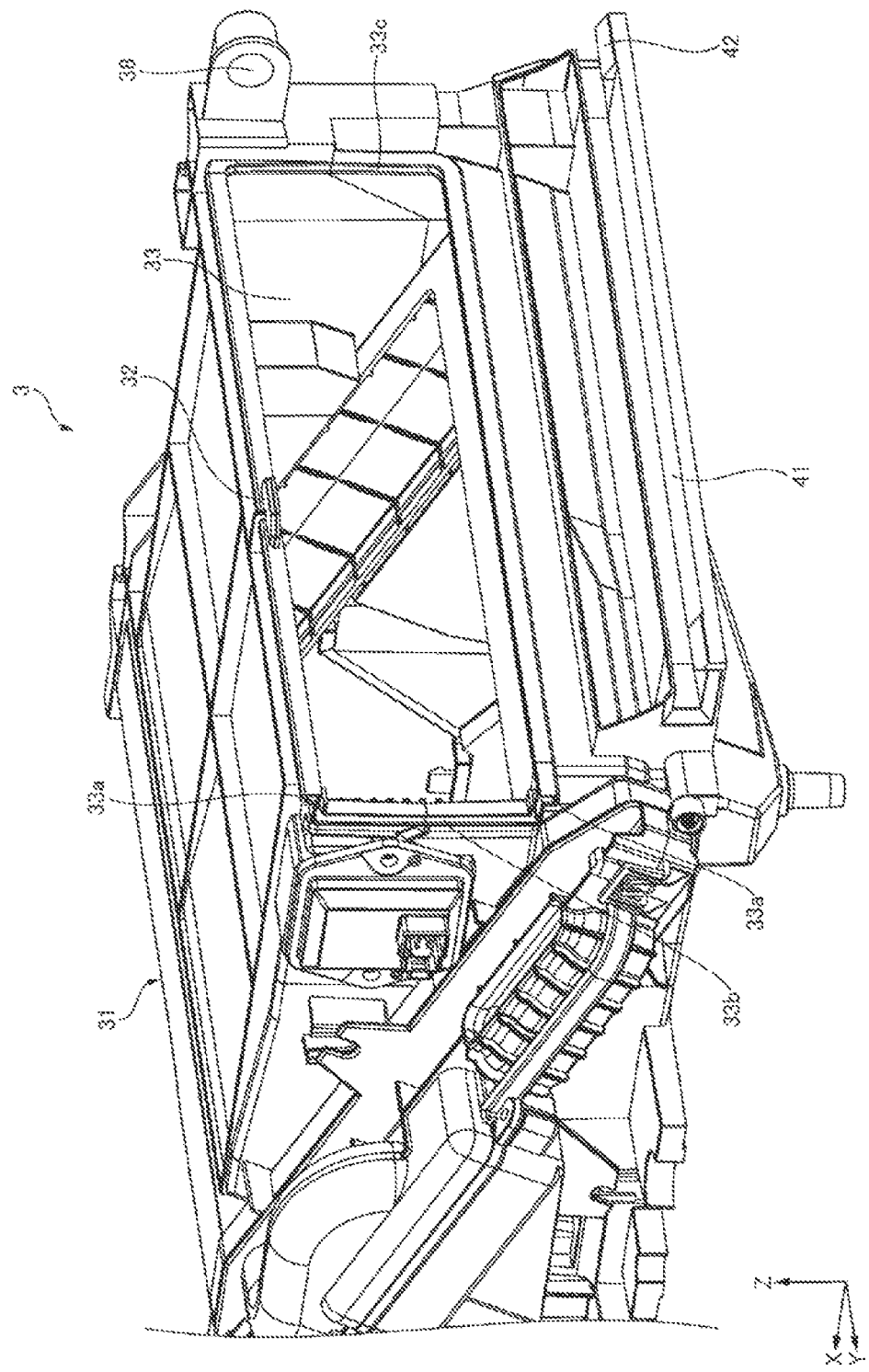
FIG. 8 is a perspective view illustrating a heat exchanger unit of the vehicle air conditioning apparatus according to an embodiment of the invention.

FIG. 2 to FIG. 4 are perspective views illustrating a schematic configuration of the whole vehicle air conditioning apparatus 1 according to an embodiment of the invention. FIG. 5 is an enlarged view illustrating an area enclosed by a dashed line of FIG. 2. FIG. 6 is a plan view illustrating the schematic configuration of the vehicle air conditioning apparatus 1. FIG. 7 is a cross-sectional view taken along line X1-X1 of FIG. 6.

The vehicle air conditioning apparatus 1 includes a blower unit 2, and a heat exchanger unit 3 connected with the blower unit 2. The blower unit 2 and the heat exchanger unit 3 are disposed along the floor of the cabin, and connected with one another to form air flow path F (the X direction in the drawing) along the width direction of the vehicle when they are installed in the vehicle. As illustrated in FIG. 2 to FIG. 4, the blower unit 2 is detachably connected with the heat exchanger unit 3 in the direction which is along the floor of the vehicle and crosses the air flow path F (the Y direction of the drawings).

The blower unit 2 includes a blower and intake parts which are integrally built therein, and configured to take in the inside air (inside air mode) or the outside air (outside air mode) of the vehicle and supply the taken air to the heat exchanger unit 3. That is, the blower unit 2 includes a blower case 21, blowers provided in the blower case 21, a blower motor to drive the blowers, an intake damper, an intake actuator to drive the intake damper, an inside air filter, and a switching mechanism such as a lever to switch between the inside air mode and the outside air mode (not shown).

As illustrated in FIG. 3 and FIG. 4, the blower case 21 is constituted by an upper case 21a and a lower case 21b which can be separated from one another in the vertical direction. In the blower case 21, an inside air inlet 22 to take the air inside the vehicle into the blower unit 2, an outside air inlet 23 to take the air outside the vehicle into the blower unit 2, blower storages 24 and 25 to store the blowers, a blower motor storage 26, an air blow opening 27 to send the air taken in the blower unit 2 to the heat exchanger unit 3, a handle 28 to pull out or push in the blower unit 2 in the front-to-back direction (the Y direction in the drawings) of the vehicle, and a guide 40 used to connect the blower unit 2 with the heat exchanger unit 3.

An inside air filter (not shown) is provided in the inside air inlet 22. When the air inside the vehicle is taken from the inside air inlet 22, the inside air filter prevents coarse particulate and so forth from entering the blower unit 2. The intake damper is provided in the outside air inlet 23.

The intake damper is driven by the intake actuator. By driving the intake damper, it is possible to selectively switch between taking the inside air and taking the outside air. That is, in the outside air mode, when the outside air inlet 23 is opened by the intake damper, the outside air can be taken from the outside air inlet 23. By this means, it is possible to take the air containing, for example, 70% outside air and 30% inside air in general, in the blower unit 2. Meanwhile, in the inside air mode, the outside air inlet 23 is closed with the intake damper, and therefore it is possible to take the air inside the vehicle into the blower unit 2 from the inside air inlet 22. In the inside air mode, it is possible to take the air containing 100% inside air into the blower unit 2. The blowers supply the air taken in the blower unit 2 to the heat exchanger unit 3 via the air blow opening 27.

The blower storages 24 and 25 store the blowers each having a plurality of blades in the circumferential direction. When the vehicle air conditioning apparatus 1 is installed in the vehicle, the blower storage 24 is located in the back side of the vehicle, and the blower storage 25 is located in the front side, and they are arranged side by side in the front-to-back direction of the vehicle (the Y direction in the drawings) so that the rotating shafts of the two blowers are located on approximately one straight line. The blower storages 24 and 25 include curved surfaces 24a and 25a along the circumferential direction of the blowers, respectively, and walls 24b and 25b configured to sandwich the curved surfaces 24a and 25a and cover the ends of the blowers in the rotating shaft direction of the blowers.

An alignment pin 24c (positioning convex portion) for alignment with the heat exchanger unit 3 is provided on the wall 24b of the blower storage 24. The alignment pin 24c protrudes from the wall 24b toward the back side of the vehicle (the direction crossing the air flow path F). The alignment pin 24c is inserted into an alignment hole 38 (positioning concave portion) provided in the heat exchanger unit 3 to fit the alignment pin 24c into the alignment hole 38.

The blower motor storage 26 is provided between the two blower storages 24 and 25. The blower motor stored in the blower motor storage 26 is configured to rotate the blower in each of the blower storages 24 and 25 to supply the air taken in the blower unit 2 to the heat exchanger unit 3 via the air blow opening 27.

As illustrated in FIG. 5, on the top of the blower motor storage 26, a regulator 26a configured to regulate the expansion of the upper surface of the heat exchanger unit 3 when the internal pressure of the heat exchanger unit 3 is increased to expand the upper surface of the heat exchanger unit 3.

The air blow opening 27 is formed in an approximately rectangular shape having a size to cover the side surface of each of the blower storages 24 and 25. The air blow opening 27 is fitted with an intake opening 33 (described in detail later) provided on the connecting surface of the heat exchanger unit 3 with the blower unit 2 to make the blower unit 2 and the heat exchanger unit 3 integrate with one another.

That is, the air blow opening 27 is fitted with the intake opening 33 to connect the blower unit 2 with the heat exchanger unit 3. By this means, the air flow path F from the blower unit 2 to the heat exchanger unit 3 is formed. The air flow path F formed by connecting the blower unit 2 with the heat exchanger unit 3 runs along the floor of the vehicle and also along the width direction of the vehicle when the vehicle air conditioning apparatus 1 is installed in the vehicle.

Here, both the connecting surface of the blower unit 2 with the heat exchanger unit 3 and the connecting surface of the heat exchanger unit 3 with the blower unit 2 cross the air flow path F. The connecting surface includes slide rails or slide grooves extending in the direction crossing the air flow path F. With the embodiment, slide rails 27a are provided on the rim of the air blow opening 27 of the blower unit 2, and slide grooves 33 are provided on the rim of the intake opening 33 of the heat exchanger unit 3.

The slide rails 27a provided on the rim of the air blow opening 27 are configured to fit into the slide grooves 33a provided on the rim of the intake opening 33. The slide rails 27a are provided in two sides, upper and lower sides of the rim of the air blow opening 27 formed in an approximately rectangular shape. A rail 27c continuous with the slide rails 27a is formed in one side of the rim of the air blow opening 27 in the back side of the vehicle. Meanwhile, in one side of the rim of the air blow opening 27 in the front side of the vehicle, a closing piece 27b is provided to maintain the airtightness of the blower unit 2 and the heat exchanger unit 3 when the air blow opening 27 and the intake opening 33 are fitted with one another.

The handle 28 is provided in the blower unit 2 on the opposite side of the outside air inlet 23 in the front-to-back direction of the vehicle to pull out the blower unit 2 to the front side of the vehicle. FIG. 6 is a plan view illustrating the vehicle air conditioning apparatus 1. As illustrated in FIG. 6, a fixing hole 29 to fix the blower unit 2 to the floor 13 of the vehicle is provided on the side surface of the blower case 21 between the handle 28 and the inside air inlet 22.

The fixing hole 29 and a corresponding fixing hole of the floor 13 are fastened with one another by using a fastener such as a screw. By this means, the blower unit 2 is aligned with and fixed to the floor 13. The fixing hole 29 is provided in the blower case 21 at a diagonal position with respect to the alignment pin 24c. In addition, the inside diameter of the fixing hole 29 is smaller than that of a mounting hole 39 (described later) of the heat exchanger unit 3.

The guide 40 is provided in the lower case 21b to protrude from a corner among the bottom surface of the lower case 21b, the air blow opening 27, and the outside air inlet 23. The guide 40 slides on a guide rail 41 provided in the heat exchanger unit 3 to connect the blower unit 2 with the heat exchanger unit 3. By this means, it is possible to easily position the blower unit 2 on the heat exchanger unit 3 in the right and left direction of the vehicle (the X direction in the drawings).

The heat exchanger unit 3 includes a heat exchanger case 31, and an evaporator and a heater core (not shown) which are accommodated in the heat exchanger case 31. The evaporator and the heater core are arranged side by side along the air flow path F in the heat exchanger case 31. The intake opening 33 fitted with the air blow opening 27 of the blower case 21 is provided on the connecting surface of the heat exchanger case 31 with the blower case 21. The intake opening 33 is formed in an approximately rectangular shape corresponding to the air blow opening 27.

The slide grooves 33a corresponding to the slide rails 27a of the air blow opening 27 are provided on the rim of the intake opening 33. The slide grooves 33a are provided in two sides, upper and lower sides of the rim of the intake opening 33 formed in an approximately rectangular shape.

A groove 33c continuous with the slide grooves 33a is formed in one side of the rim of the intake opening 33 in the back side of the vehicle, and is fitted with the rail 27c of the air blow opening 27 when the air blow opening 27 and the intake opening 33 are fitted with one another. A rail opening 33b into which the slide rails 27a are inserted is provided on one side of the rim of the intake opening 33 in the front side of the vehicle. The rail opening 33b is closed with the closing piece 27b of the air blow opening 27 when the air blow opening 27 and the intake opening 33 are fitted with one another.

A flange 32 continuous with the upper surface of the heat exchanger case 31 projects from the center of the upper side of the intake opening 33 toward the blower unit 2. The flange 32 is engaged with the regulator 26a of the blower case 21 from below to allow the regulator 26a to regulate an upward displacement of the upper surface of the heat exchanger unit 3 when the upper surface of the heat exchanger unit 3 expands.

The guide rail 41 to slide the guide 40 is provided under the connecting surface of the heat exchanger case 31 with the blower unit 2. A stopper 42 to contact the guide 40 is provided at the end of the guide rail 41 in the back side of the vehicle. The guide 40 contacts the stopper 42 to position the blower unit 2 on the heat exchanger unit 3 in the front-to-back direction of the vehicle.

Forward outlets 34, 35 and 36 and a backward outlet 37 are provided in the heat exchanger case 31. The air supplied from the blower unit 2 and having the temperature adjusted by the evaporator and the heater core is blown to the front side of the vehicle from the forward outlets 34, 35 and 36, and blown to the back side of the vehicle from the backward outlet 37. The alignment hole 38 corresponding to the alignment pin 24c is provided near the upper part of the intake opening 33 in the back side of the vehicle.

Mounting holes 39 to mount the vehicle air conditioning apparatus 1 to the floor 13 are provided in four points of the heat exchanger case 31. The mounting holes 39 are fastened with corresponding mounting holes of the floor 13 by using screws. By this means, the vehicle air conditioning apparatus 1 is fixed to the floor 13.

In the vehicle air conditioning apparatus 1 configured as described above, the blower unit 2 can be attached to and detached from the heat exchanger unit 3 in the front-to-back direction of the vehicle. To be more specific, the blower unit 2 can be attached to and detached from the heat exchanger unit 3 as follows.

<Attaching the Blower Unit 2 to the Heat Exchanger Unit 3>

The slide rails 27a of the air blow opening 27 of the blower unit 2 are inserted from the rail opening 33b of the intake opening 33 of the heat exchanger unit 3, and the blower unit 2 is pushed in the heat exchanger unit 3. In this case, the guide 40 is aligned with the end of the guide rail 41 in the front side of the vehicle, and then the blower unit 2 is pushed in the heat exchanger unit 3. By this means, the rail 27c is slid into the slide groove 33c, and the guide 40 is slid into the guide rail 41. The blower unit 2 is pushed in the heat exchanger unit 3 until the slide rail 27a in the back side of the vehicle is fitted in the slide groove 33a in the back side of the vehicle, and the guide 40 contacts the stopper 42.

When the rail 27c in the back side of the vehicle is fitted in the groove 33c in the back side of the vehicle, the upper rail 27c is fitted in the upper groove 33c, as well as the lower rail 27c is fitted in the lower groove 33c. Moreover, the closing piece 27b of the air blow opening 27 closes the rail opening 33b, and therefore the air blow opening 27 and the intake opening 33 are air-tightly connected with one another over the entire circumference. In this case, the regulator 26a is engaged with the flange 32 from above to insert the alignment pin 24c into the alignment hole 38. In this way, the blower unit 2 and the heat exchanger unit 3 are connected and integrated with one another to constitute the vehicle air conditioning apparatus 1.

In the vehicle air conditioning apparatus 1, the slide rails 27a are fitted into the slide grooves 33a, and the rail opening 33b is closed with the closing piece 27b. By this means, the air blow opening 27 and the intake opening 33 are air-tightly connected with one another over the entire circumference to prevent the air passing through the air blow opening 27 and the intake opening 33 from being leaked to the outside. By this means, the blower unit 2 and the heat exchanger unit 3 are connected with one another, and the air flow path F from the blower unit 2 to the heat exchanger unit 3 is formed in the vehicle air conditioning apparatus 1.

In this state, the alignment pin 24c is inserted into the alignment hole 38 to firmly fix the blower unit 2 to the heat exchanger unit 3 in a desired position. The regulator 26a is engaged with the flange 32 from above. Therefore, even when the internal pressure of the heat exchanger unit 3 is increased to expand the upper surface of the heat exchanger case 31, the flange 32 is pushed down from above by the regulator 26a to regulate the expansion.

When this vehicle air conditioning apparatus 1 is mounted in the vehicle, the fixing hole 29 and the mounting holes 39 are aligned with mounting holes provided on the floor 13 and fastened by using fasteners such as screws. By this means, the vehicle air conditioning apparatus 1 is installed on the floor 13 of the floor.

The alignment pin 24a is placed diagonally to the fixing hole 29 in the blower unit 2, and therefore it is possible to firmly fix the blower unit 2 to the floor 13 and the heat exchanger unit 3 without any fastener.

<Detaching the Blower Unit 2 from the Heat Exchanger Unit 3>

The fastening of the fixing hole 29 with the corresponding hole of the floor 13 is released by using a screw driver and so forth, from an opening of the seat bracket 12 in the front side of the vehicle. By this means, the connection of the vehicle with the blower unit 2 is released.

The blower unit 2 and the heat exchanger unit 3 are fixed to one another by the fitting of the slide rails 27a into the slide grooves 33a, and the insertion of the alignment pin 24c into the alignment hole 38. Therefore, simply by releasing the fastening of the fixing hole 29 with the floor 13, it is possible to easily detach the blower unit 2 from the heat exchanger unit 3 by holding and pulling out the handle 28 to the front side of the vehicle.

Therefore, for the maintenance of the blower unit 2, there is no need to remove the driver seat 1 and the seat bracket 12, but simply by taking out the blower unit 2, it is possible to conduct maintenance such as repair, replacement, and cleaning of all of the functional parts included in the blower unit 2. In this way, it is possible to reduce the number of steps of the maintenance of the blower unit 2, and therefore improve the efficiency of the maintenance. In addition, by taking out the blower unit 2, the worker can visually check the condition of the parts such as the evaporator included in the heat exchanger unit 3 from the opening of the heat exchanger unit 3. This helps to determine the need of maintenance of the heat exchanger unit 3.

In the vehicle air conditioning apparatus 1 installed in the vehicle, when the blower unit 2 detached for the maintenance is attached to the heat exchanger unit 3 under the seat bracket 12 again, the slide rails 27a of the air blow opening 27 of the blower unit 2 are inserted from the rail opening 33a, and the blower unit 2 is pushed in the heat exchanger unit 3 in the same way as described above. In this case, the diameter of the fixing hole 29 is smaller than that of the mounting holes 39, and therefore the blower unit 2 can be precisely aligned with the heat exchanger unit 3 and the floor 13 and fixed.

As described above, the embodiments of the present invention have been described in detail with reference to the drawings. However, the specific configuration is not limited to these embodiments, and the design can be changed without departing from the scope of the present invention.

REFERENCE SIGNS LIST

1: vehicle air conditioning apparatus,
2: blower unit,
3: heat exchanger unit,
11: driver seat,
12: seat bracket,
13: floor
21: blower case,
21a: upper case,
21b: lower case,
22: inside air inlet,
23: out air inlet,
24, 25: blower storage,
24a, 25a: curved surface
24b, 25b: wall,
24c: alignment pin,
26: blower motor storage,
26a: regulator,
27: air blow opening,
27a: slide rail,
27b: closing piece,
27c: rail,
28: handle,
29: fixing hole,
31: heat exchanger case,
32: flange,
33: intake opening,
33a: slide groove,
33b: rail opening,
33c: groove,
34, 35, 36: forward outlet,
37: backward outlet,
38: alignment hole,
39: mounting hole,
40: guide,
41: guide rail,
42: stopper,
F: air flow path

The invention claimed is:

1. A vehicle air conditioning apparatus installed between a part under a seat and a floor of a vehicle, the vehicle air conditioning apparatus comprising:
    a blower unit including a blower; and
    a heat exchanger unit including a heat exchanger, wherein:
    the blower unit and the heat exchanger unit are connected with one another to form an air flow path along the floor of the vehicle;
    the blower unit is detachably connected with the heat exchanger unit in a direction crossing the air flow path and being along the floor of the vehicle; and
    a regulator configured to regulate expansion of the heat exchanger unit is provided above the connecting surface of the blower unit with the heat exchanger unit.

2. The vehicle air conditioning apparatus according to claim 1, further comprising:
    a slide rail provided in one of a connecting surface of the blower unit with the heat exchanger unit and a connecting surface of the heat exchanger unit with the blower unit, the slide rail extending in the direction crossing the air flow path;
    a slide groove provided in the other one of the connecting surface of the blower unit with the heat exchanger unit and the connecting surface of the heat exchanger unit with the blower unit, the slide groove corresponding to the slide rail,
    wherein the slide rail is slid into the slide groove, so that the blower unit is detachably attached to the heat exchanger unit.

3. The vehicle air conditioning apparatus according to claim 1, further comprising:
    a positioning convex portion provided in one of the blower unit and the heat exchanger unit to position the blower unit on the heat exchanger unit; and
    a positioning concave portion provided in the other one of the blower unit and the heat exchanger unit, the positioning convex portion being fitted into the positioning concave portion,
    wherein the positioning convex portion protrudes in the direction crossing the air flow path.

4. The vehicle air conditioning apparatus according to claim 3, wherein a fixing hole is provided in the blower unit at a diagonal position with respect to one of the positioning convex portion and the positioning concave portion in a plan view to position and fix the blower unit on the floor of the vehicle.

5. The vehicle air conditioning apparatus according to claim 4, wherein:
   the heat exchanger unit includes a mounting hole to mount the heat exchanger unit on the floor; and
   a diameter of the fixing hole is smaller than a diameter of the mounting hole.

6. The vehicle air conditioning apparatus according to claim 1, further comprising:
   an air blow opening provided in the connecting surface of the blower unit with the heat exchanger unit to send air to the heat exchanger unit; and
   an intake opening provided in the connecting surface of the heat exchanger unit with the blower unit to take in the air from the air blow opening,
   wherein the air blow opening and the intake opening are fitted with one another.

7. The vehicle air conditioning apparatus according to claim 1, further comprising:
   a guide provided in one of the connecting surface of the blower unit with the heat exchanger unit and the connecting surface of the heat exchanger unit with the blower unit to position the blower unit and the heat exchanger unit in the direction along the air flow path; and
   a guide rail provided in the other one of the connecting surface of the blower unit with the heat exchanger unit and the connecting surface of the heat exchanger unit with the blower unit, the guide rail corresponding to the guide.

* * * * *